(12) United States Patent
Holzmann et al.

(10) Patent No.: US 9,628,202 B2
(45) Date of Patent: Apr. 18, 2017

(54) TESTING FRONT END MODULES, TESTING METHODS AND MODULAR TESTING SYSTEMS FOR TESTING ELECTRONIC EQUIPMENT

(71) Applicant: Rohde & Schwarz GmbH & Co. KG, Munich (DE)

(72) Inventors: Gottfried Holzmann, Zorneding (DE); Ralf Plaumann, Forstern (DE); Peter Wolanin, Kranzberg (DE); Wilfried Dilling, Assling (DE); Rudolf Schindlmeier, Gilching (DE); Rolf Lorenzen, Taufkirchen (DE); Anton Steinegger, Munich (DE); Werner Mittermaier, Erding (DE)

(73) Assignee: ROHDE & SCHWARZ GMBH & CO. KG, Munich (DE)

(*) Notice: Subject to any disclaimer, the term of this patent is extended or adjusted under 35 U.S.C. 154(b) by 80 days.

(21) Appl. No.: 14/633,966

(22) Filed: Feb. 27, 2015

(65) Prior Publication Data

US 2016/0253252 A1   Sep. 1, 2016

(51) Int. Cl.
| | |
|---|---|
| *H04B 17/00* | (2015.01) |
| *G06F 11/22* | (2006.01) |
| *G06F 11/273* | (2006.01) |

(52) U.S. Cl.
CPC ...... *H04B 17/0085* (2013.01); *G06F 11/2294* (2013.01); *G06F 11/273* (2013.01)

(58) Field of Classification Search
CPC ............................ H04B 17/00; H04B 17/0085
See application file for complete search history.

(56) References Cited

U.S. PATENT DOCUMENTS

| | | | |
|---|---|---|---|
| 6,169,413 B1 | 1/2001 | Paek et al. | |
| 7,564,893 B2 * | 7/2009 | O'Neill | H04L 1/243 375/219 |

(Continued)

OTHER PUBLICATIONS

Hsu-Feng Hsiao, Shuw-Guann Lin, Sy-Haur Su, Chih-Ho Tu, Da-Chiang Chang, Ying-Zong Juang, and Hwann-Kaeo Chiou; "Bit Error Rate Measurement System for RF Integrated Circuits;" Instrumentation and Measurement Technology Conference (I2MTC), 2012 IEEE International; May 2012.*

(Continued)

*Primary Examiner* — Joseph Kudirka
(74) *Attorney, Agent, or Firm* — Jenkins, Wilson, Taylor & Hunt, P.A.

(57) ABSTRACT

A testing front end module for testing a plurality of devices under test (DUT) includes a testing signal interface, a vector signal generator (VSG) coupled to the testing signal interface and configured to generate testing signals upon reception of testing routine signals from a remote controller via the testing signal interface, a vector signal analyzer (VSA) coupled to the testing signal interface and configured to receive testing response signals from a plurality of DUTs and to transmit the received testing response signals to the remote controller via the testing signal interface, a multiplexer/demultiplexer (MUX/DEMUX) coupled to the VSG and the VSA, the MUX/DEMUX being configured to multiplex the received testing response signals and to demultiplex the generated testing signals, and a test device interface coupled to the MUX/DEMUX and configured to couple the testing front end module to the plurality of DUTs.

18 Claims, 2 Drawing Sheets

(56) References Cited

U.S. PATENT DOCUMENTS

| | | |
|---|---|---|
| 7,884,599 B2 | 2/2011 | Habib et al. |
| 7,962,823 B2 * | 6/2011 | Olgaard .................. H04L 43/50 365/201 |
| 8,085,685 B2 * | 12/2011 | Olgaard .................. H04L 12/56 370/242 |
| 8,842,549 B2 * | 9/2014 | Olgaard .................. H04L 43/50 370/241 |
| 8,842,552 B2 * | 9/2014 | Olgaard ................ H04W 24/06 370/242 |
| 9,274,175 B2 | 3/2016 | Golov et al. |
| 2005/0240852 A1 | 10/2005 | Inaba et al. |
| 2008/0285467 A1 * | 11/2008 | Olgaard ............. H04B 17/0085 370/242 |
| 2009/0092177 A1 | 4/2009 | Dvorak et al. |
| 2010/0077270 A1 | 3/2010 | Rupp et al. |
| 2010/0123471 A1 | 5/2010 | Olgaard et al. |
| 2010/0127918 A1 | 5/2010 | Vadlamani et al. |
| 2010/0268459 A1 | 10/2010 | O'Shea |
| 2012/0123723 A1 * | 5/2012 | El-Hassan .......... H04B 17/0085 702/108 |
| 2013/0243057 A1 | 9/2013 | Dark et al. |
| 2013/0266052 A1 * | 10/2013 | Yang .................. H04B 17/0085 375/224 |
| 2013/0326291 A1 | 12/2013 | Elserougi et al. |
| 2014/0090799 A1 | 4/2014 | Waniuk et al. |
| 2015/0244477 A1 | 8/2015 | Hirst et al. |

OTHER PUBLICATIONS

Non-Final Office Action for U.S. Appl. No. 14/635,863 (Jul. 1, 2016).

* cited by examiner

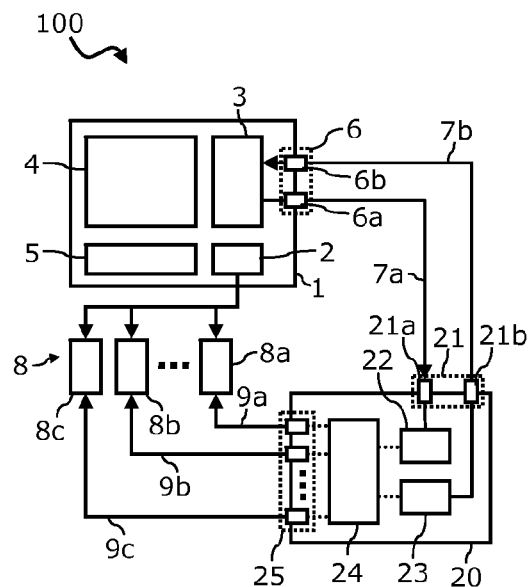
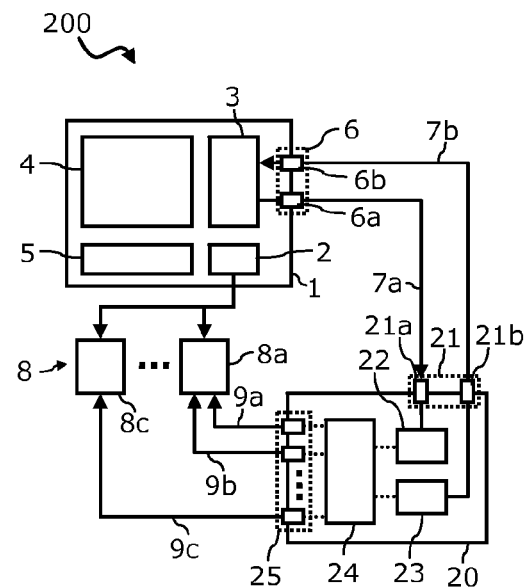
Fig. 1  Fig. 2
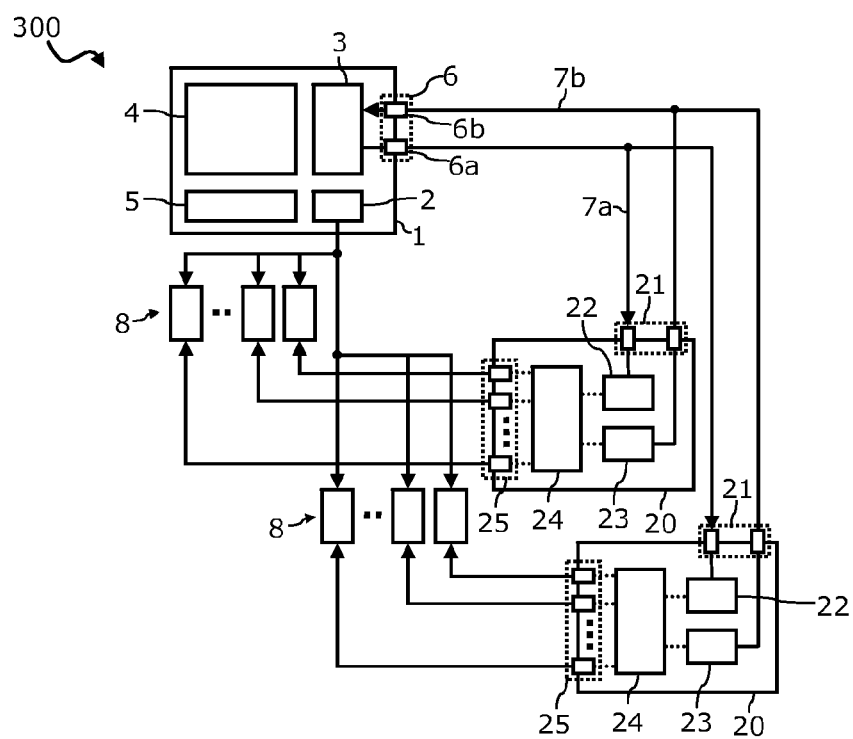
Fig. 3

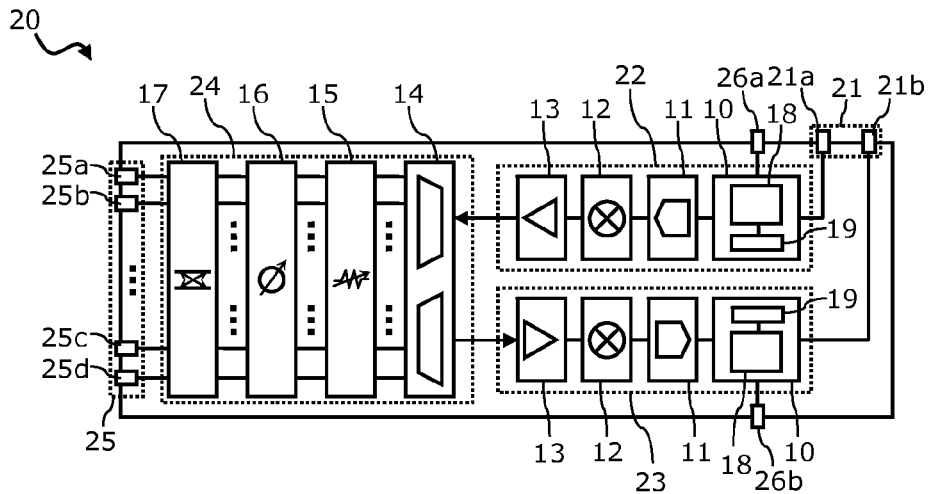
Fig. 4
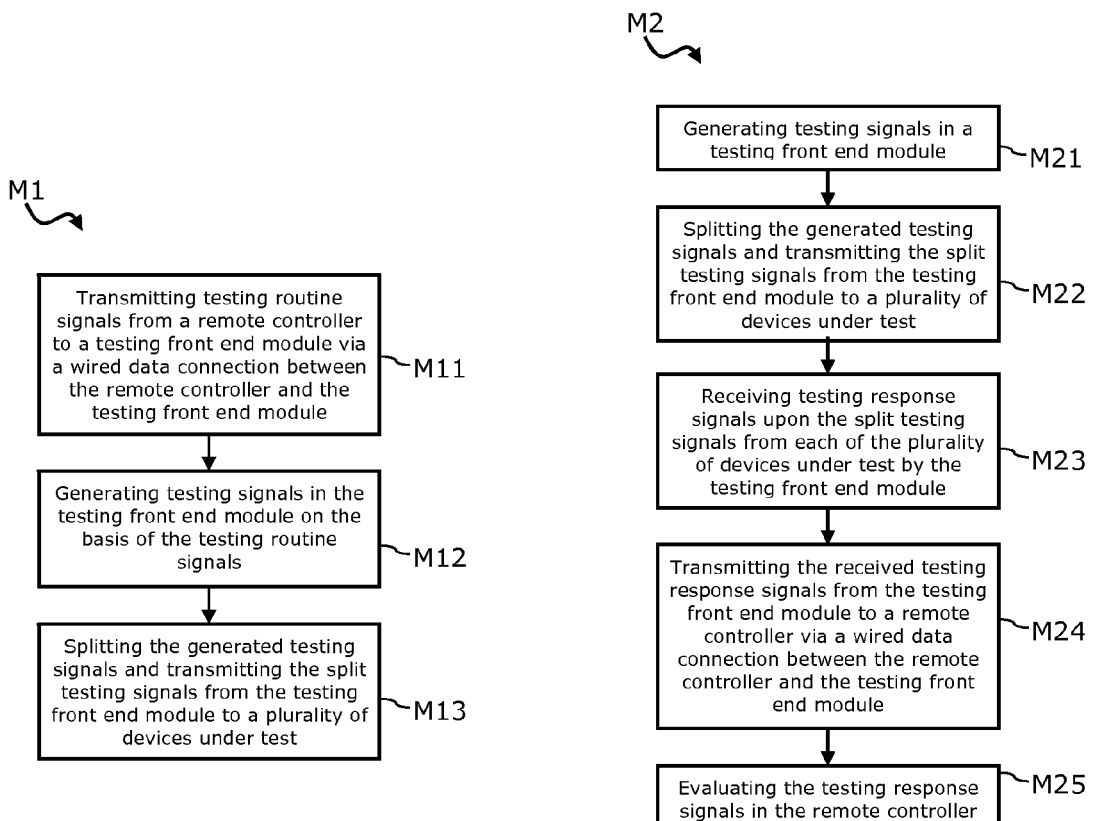
Fig. 5
Fig. 6

TESTING FRONT END MODULES, TESTING METHODS AND MODULAR TESTING SYSTEMS FOR TESTING ELECTRONIC EQUIPMENT

FIELD OF THE INVENTION

The present invention relates to testing front end modules, testing methods and modular testing systems. Such modules, methods and systems may be employed for testing electronic equipment, particularly mobile communication devices and mobile computing devices.

BACKGROUND OF THE INVENTION

Electronic equipment, such as a mobile communication device or a mobile computing device, is subject to various electronic tests after production. Such tests are generally necessary to ensure proper configuration, calibration and functionality of various elements of the devices under test (DUT). For testing purposes, specific testing devices are employed which simulate a testing environment under predefined testing conditions. For example, testing devices may employ one or more specific testing routines with predefined testing schedules. Those testing schedules regularly involve input of particular test signal sequences into the DUT and/or reception of responses to testing signals input to the DUT. Such responses may be evaluated for consistency, constancy, timeliness and other properties of an expected behaviour of the DUT.

Of particular relevance are tests and testing devices for electronic equipment which is operated in an environment sensitive to radio frequency (RF) signals. Such equipment may be used to output, receive, measure or otherwise process RF-sensitive parameters and signals. Those tests are conventionally performed using standardized testing routines conducted by specifically designed testing equipment that is connected to a DUT.

Testing contemporary DUTs is currently very time-consuming: Given the high complexity of modern electronic equipment and its proliferation as mass product, testing each and every DUT suffers from potentially low throughput and high costs associated with the testing cycles, slowing down manufacturing processes and verification procedures. Thus, there is an increasing demand in solutions for testing multiple electronic devices in a more efficient manner. In particular, solutions that improve testing speed, testing quality and testing costs of electronic equipment, particularly RF-sensitive equipment, are highly sought after.

For example, document U.S. 2005/0240852 A1 discloses a testing apparatus having a plurality of testing module slots to which different types of testing modules for testing a DUT may be mounted.

SUMMARY OF THE INVENTION

According to the disclosure of present invention testing methods, testing front end modules and modular testing systems may be implemented.

Specifically, according to a first aspect of the invention, a first testing method for testing a plurality of devices under test (DUT) includes transmitting testing routine signals from a remote controller to a testing front end module via a wired data connection between the remote controller and the testing front end module, generating testing signals in the testing front end module on the basis of the testing routine signals, and splitting the generated testing signals and transmitting the split testing signals from the testing front end module to a plurality of DUTs.

According to a second aspect of the invention, a second testing method for testing a plurality of devices under test (DUT) includes generating testing signals in a testing front end module, splitting the generated testing signals and transmitting the split testing signals from the testing front end module to a plurality of DUTs, receiving testing response signals upon the split testing signals from each of the plurality of DUTs by the testing front end module, transmitting the received testing response signals from the testing front end module to a remote controller via a wired data connection between the remote controller and the testing front end module, and evaluating the testing response signals in the remote controller.

According to a third aspect of the invention, a testing front end module for testing a plurality of devices under test (DUT) includes a testing signal interface, a vector signal generator (VSG) coupled to the testing signal interface and configured to generate testing signals upon reception of testing routine signals from a remote controller via the testing signal interface, a vector signal analyser (VSA) coupled to the testing signal interface and configured to receive testing response signals from a plurality of DUTs and to transmit the received testing response signals to the remote controller via the testing signal interface, a multiplexer/demultiplexer (MUX/DEMUX) coupled to the VSG and the VSA, the MUX/DEMUX being configured to multiplex the received testing response signals and to demultiplex the generated testing signals, and a test device interface coupled to the MUX/DEMUX and configured to couple the testing front end module to the plurality of DUTs.

According to a fourth aspect of the invention, a modular testing system for testing a plurality of devices under test (DUT) includes a testing front end module according to one of the aspects of the invention, and a controller coupled to the testing signal interface of the testing front end module via a wired data connection.

One idea of the present invention is to separate the testing front end module from the backend controller that is responsible for controlling the testing routines and for evaluating the testing results. More often than not, users utilizing the testing front end module may employ their own computer or data processing apparatus for testing purposes. Deliberately omitting any of those controlling means in a testing front end module may provide for a smaller, lighter and more efficient portable device that may be placed very near to the DUTs, i.e. "on-site".

Amongst others, there are several specific advantages associated with such testing front end modules and their concomitant testing methods. The testing front end module may be less expensive to implement since most controlling functions may be outsourced. The data transfer between the external controller and the testing front end module may be standardized and may rely on conventional data transfer protocols. The modular implementation and the standardized data transfer concept allow for high flexibility in the choice of controllers and controller types. The whole testing system may be easily adapted to the testing environment due to the flexible connection between external controller and testing front end module.

Due to the light implementation of the testing front end module and the modularized testing methods, the power supply for the testing front end module has less power requirements as well. Thus, the power supply may be outsourced and the cooling concept for the "on-site" module may be simplified. Eventually, passive cooling concepts may be sufficient, thus eliminating the need for complex active cooling and thereby reducing implementation costs and energy consumption.

The modularity of the whole testing systems further allows for very flexible adaptation on the number of DUTs and/or the number of tests to be performed in parallel. Specifically for the growing technical and functional diversification of mobile communication and computing devices, such flexibility may be put to great use when trying to efficiently and quickly meet testing demands on time.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the accompanying drawings. Elements in the drawings are illustrated for simplicity and clarity and have not necessarily been drawn to scale.

FIG. 1 schematically illustrates a modular testing system according to an embodiment of the invention.

FIG. 2 schematically illustrates a modular testing system according to another embodiment of the invention.

FIG. 3 schematically illustrates a modular testing system according to yet another embodiment of the invention.

FIG. 4 schematically illustrates a testing front end module according to a further embodiment of the invention.

FIG. 5 shows a flowchart of procedural stages of a first testing method for testing electronic equipment according to a further embodiment of the invention.

FIG. 6 shows a flowchart of procedural stages of a second testing method for testing electronic equipment according to another embodiment of the invention.

In all figures of the drawings elements, features and components which are the same or at least have the same functionality have been provided with the same reference symbols, unless explicitly stated otherwise.

DETAILED DESCRIPTION OF THE EMBODIMENTS

FIGS. 1, 2 and 3 schematically illustrate modular testing systems 100, 200 and 300, respectively. The modular testing systems 100, 200, 300 may be employed to perform functional tests and testing routines on one or more devices under test (DUT) which are generally denoted with reference sign 8 in FIGS. 1, 2 and 3. Specifically, the modular testing systems 100, 200, 300 may be used to perform tests for mobile communication or computing devices such as laptops, notebooks, tablets, smartphones, mobile phones, pagers, PDAs, digital still cameras, digital video cameras, portable media players, gaming consoles, virtual reality glasses, mobile PCs and similar electronic equipment. Of course, it should be recognized that other non-mobile electronic equipment may be tested as well, such as—but not limited to—industrial field devices, radio communication base stations, video and TV devices, audio devices like loudspeakers and similar.

The number of DUTs 8 to be tested simultaneously or in parallel is in general not limited to any particular number, but will be determined by the properties and facilities of the testing equipment employed, as will be detailed hereinbelow. Generally, it is desirable to test as many DUTs 8 as possible at the same time in order to increase the efficiency of the testing routines and to keep the overall testing time for a batch of DUTs 8 as short as possible. The modular testing systems 100, 200 and 300 may particularly be configured and adapted to perform one of the testing methods M1 and M2 as shown and explained in conjunction with FIGS. 5 and 6 below.

Referring to FIGS. 1, 2 and 3, the modular testing systems 100, 200 and 300 each comprise a controller 1 and at least one testing front end module 20 coupled to the controller 1. The modular testing systems 100, 200 and 300 may comprise a number of DUTs 8 which are coupled to the at least testing front end module 20 on one hand and to the controller 1 on the other hand.

The controller 1 may include a testing device controller 2, a testing routine controller 3, a display 4 and one or more input devices 5. In particular, the controller 1 may be a conventional personal computer or a data processing apparatus such as a tablet, a laptop, a notebook, a desktop PC or a similar computing device. The one or more input devices 5 may for example comprise a mouse, a trackball, a keyboard and/or similar user actuated controlling devices. Upon input of commands and/or upon reception and transmission of testing signals the display 4 may be configured to display relevant information to the user of the controller 1. The controller 1 may further comprise one or more central processing units, memory devices, power supply devices and similar apparatuses common for computing devices.

The controller 1 further comprises a controller testing interface 6, for example a USB interface, a PCIe ("Peripheral Component Interconnect Express") interface, a Thunderbolt interface or a Firewire interface. Depending on the type of interface, the controller testing interface 6 may comprise one or more ports 6a, 6b to which electrical connectors such as cables may be connected to form wired connections between the controller 1 and the testing front end module 20. The electrical connectors may for example be USB cables, PCIe cables, Thunderbolt cables or Firewire cables.

The length of the electrical connector(s) 7a, 7b used to form the wired connections between the controller 1 and the testing front end module 20 may in particular be larger than about 1.5 meters (60 inches), particularly larger than about 2 meters (80 inches), and more particularly larger than about 2.5 meters (100 inches). This has the advantage that there is some leeway in placing the testing front end module 20 near the DUTs 8 and remotely placing the controller 1 at a more convenient and better accessible workplace. The data rate of data transmitted between the controller 1 and the testing front end module 20 via the wired connections in form of the electrical connector(s) 7a, 7b may in particular be larger than 1 Mbps, particularly larger than 2 Mbps, more particularly larger than 10 Mbps. The wired connections may be full duplex or at least half-duplex.

The testing routine controller 3 of the controller 1 may be configured to generate testing routine signals to be sent to the testing front end module 20. The testing routine signals may be generated according to the desired testing routine to be performed on one or more of the DUTs 8. The testing routine signals may involve instructions on specific testing signals or testing signal sequences and their respective properties like signal frequency, signal amplitude, signalling strength, pulse duration, pulse rate or similar. The testing signals to be generated on the basis of the testing routine signals may then be generated in the testing front end module 20 upon receipt at its testing signal interface.

The testing routine controller 3 of the controller 1 may further be configured to evaluate any testing response signals that are received from one or more of the plurality of DUTs 8. The testing response signals may be received by the testing front end module 20 in an expected response to one or more of the testing signals emitted by the testing front end module 20. Alternatively or additionally, the testing response signals may be received by the testing front end module 20 upon direct instructions to the DUTs sent by the testing device controller 2.

The testing device controller 2 may be directly (via wire or wirelessly) coupled to each one of the plurality of DUTs 8 and may send out instructions for the DUTs to emit testing response signals. For example, the testing device controller 2 may elicit the DUTs to transmit specific signals or signal sequences of predefined properties, such as signal frequency, signal amplitude, signalling strength, pulse duration, pulse rate or similar.

The DUTs 8 are in turn connected to input/output ports of a testing device interface 25 of the testing front end module 20. As exemplarily shown in FIG. 1, each of the DUTs 8a, 8b, 8c is connected by cable 9a, 9b, 9c to one of the input/output ports of the testing device interface 25. Alternatively or additionally, it may be possible to connect one or more of the DUTs 8a to more than one of the input/output ports of the testing device interface 25, as exemplarily shown in FIG. 2. For example, DUTs 8 that have more than one subcomponents to test, such as for example MIMO antennae, processing chips or similar components, may be subject to concomitant tests over different testing channels. Thus, such DUTs may be connected to different input/output ports at the same time.

The number of input/output ports of the testing device interface 25 is in principle not limited. However, the number of input/output ports may be four or more, more particularly eight or more. The number of input/output ports will determine how many DUTs and/or how many testing routines may be tested in parallel.

FIG. 3 schematically illustrates a modular testing system 300 where there are two separate testing front end modules 20 connected to the same controller 1 via the controller testing interface 6 of the controller 1. In that embodiment, the controller 1 may simultaneously control more than one testing front end module 20 to be able to test an even greater number of DUTs at the same time. Furthermore, due to the physical separation of the testing front end modules 20, the controller 1 may simultaneously perform testing routines on DUTs 8 in separate locations, for example on DUTs in different environments.

The two separate testing front end modules 20 may be in communication with each other so that the controller 1 may perform testing routines on the DUTs 8 connected to the different testing front end modules 20 in synchronization. Moreover, the provision of two separate testing front end modules 20 may limit the power consumption of each testing front end module 20 with the same amount of testing resources so that the cooling of each testing front end module 20 may be simplified.

Further, the testing front end modules 20 may operate for the testing of mobile communication devices in different frequency bands which might otherwise be difficult to test simultaneously on a single testing front end module 20 that does not have the capability of generating test signals in different frequency bands. Additionally, the physical separation of testing front end modules 20 may be advantageous for avoiding unwanted leakage or noise signals disturbing the testing routines, thereby enhancing the electromagnetic compatibility (EMC) of the testing system 300.

FIG. 4 schematically illustrates a testing front end module 20 as it may be employed in any of the modular testing systems 100, 200 and 300 of FIGS. 1 to 3. The testing front end module 20 of FIG. 4 may be used in putting any of the testing methods M1 and M2 of FIGS. 5 and 6 into practice. The details of the testing front end module 20 as shown in FIG. 4 are of exemplary nature—it should be understood that different configurations may be possible for the testing front end module 20 depending on the type and nature of the DUTs and test to be performed. Moreover, not every testing front end module 20 within the scope of the disclosure does necessarily need to have each and every subcomponent as exemplarily depicted in FIG. 4.

The testing front end module 20 generally comprises a testing signal interface 21, a vector signal generator (VSG) 22, a vector signal analyser (VSA) 23, a multiplexer/demultiplexer (MUX/DEMUX) 24 and a test device interface 25. The testing signal interface 21 is coupled to each of the VSG 22 and VSA 23 via a respective testing signal interface port 21a and 21b. The testing signal interface 21 may in particular be any of a USB interface, a PCIe interface, a Thunderbolt interface or a Firewire interface.

The VSG 22 is configured to generate testing signals for testing DUTs that may be connected to the test device interface 25 of the testing front end module 20. Upon reception of testing routine signals from a remote controller, such as the controller 1 of FIGS. 1 to 3, via the testing signal interface 21, the VSG 22 may generate the testing signals using a processing circuit 10 connected testing signal interface 21. The processing circuit 10 may comprise a processor 18, for example a PLD such as an FPGA or an ASIC. The processing circuit 10 may further comprise a memory 19 such as a flash memory to store firmware, operating software and predefined configuration values used for the operation of the processor 18.

Downstream of the processing circuit 10, the VSG 22 may comprise a digital-to-analog converter 11, an RF up-converter 12 and/or a (pre-)amplifier 13. The digital-to-analog converter 11 may be configured to convert the digital testing signals generated by the processing circuit 10 to analog testing signals which are subsequently mixed to the testing frequency with the RF up-converter 12 using a local oscillator frequency. The up-converted testing signals may then be suitably amplified in order to prevent power loss during the subsequent splitting of the testing signals.

The VSA 23 is also coupled to the testing signal interface 21 and is configured to receive testing response signals from a plurality of DUTs connected to the test device interface 25. In order to receive and pre-process the testing response signals, the VSA 23 may comprise a (pre-)amplifier 13, an RF down-converter 12 coupled downstream of the amplifier 13 and an analog-to-digital converter 11. The analog-to-digital converter 11 is coupled to a processing circuit 10 which may comprise—similar to the processing circuit 10 of the VSG 22—a processor 18 and a memory 19. The received testing response signals are amplified by the amplifier 13, down-converted to baseband using the RF down-converter 12 and digitized by the analog-to-digital converter 11. The digitized testing response signals are then pre-processed by the processing circuit 10 and transmitted to the remote controller 1 via the testing signal interface 21 for further evaluation and processing. In that regard, the processing circuit 10 and of the VSA 23 does not need to have full testing evaluation capacity and may be kept lightweight and simple.

Both the VSG 22 and the VSA 23 may comprise a separate power supply port 26a and 26b which may be integrated into a common power supply interface of the testing front end module 20. With the separate power supply ports 26a and 26b, the energy demand of the VSG 22 and VSA 23 may be met without the need for a module-internal power supply. To this end, an external power supply may be coupled to the power supply interface of the testing front end module 20. This enables the testing front end module 20 to be kept lightweight and renders a simple cooling concept possible. The cooling may for example be performed by implementing cooling fins on the outside of the housing or shell of the testing front end module 20.

The VSG 22 and the VSA 23 are both coupled to a multiplexer/demultiplexer (MUX/DEMUX) 24. The MUX/DEMUX 24 is generally configured to multiplex the received testing response signals from the DUTs for reception by the VSA 23 and to demultiplex the generated testing signals by the VSG 22 for distribution among the DUTs. The MUX/DEMUX 24 is coupled to the test device interface 25 that may comprise a number of input/output ports 25a to 25d coupled to respective pins of the MUX/DEMUX 24 downstream of the VSG 22 and VSA 23.

The MUX/DEMUX 24 may comprise a multiplexing fabric 14 which switches the inputs of the VSG 22 and VSA 23 to a set of independently controllable attenuators 15. The attenuators 15 may be advantageously used for selective attenuating the power of the respective testing signal channels to the respective DUT connected to the channel. The attenuators 15 may for example comprise Lange or Wilkinson couplers, for example with a coupling factor of 3 dB. The attenuators 15 may be coupled to a set of independently controllable calibration units 16 which may be used to calibrate the MUX/DEMUX 24 and its transient power dissipation. The calibration units 16 may advantageously allow the selective activation of a feedback loop between the VSG 22 and the VSA 23 to calibrate both devices. The calibration units 16 may be coupled to a switch fabric 17 which is configured to selective switch the input/output ports 25a to 25d of the test device interface 25 to one of the VSA 23 and the VSG 22. The switch fabric 17 may for example comprise directional couplers and/or power splitters/combiners.

FIGS. 5 and 6 schematically illustrate procedural stages of testing methods M1 and M2, respectively. The testing methods M1 and M2 may be performed using the modular testing systems 100, 200 or 300 of one of the FIGS. 1 to 3 and the testing front end module 20 of FIG. 4. The testing methods M1 and M2 may advantageously be used for testing a plurality of DUTs, such as mobile communication devices or mobile computing devices.

In a first method M1, testing routine signals are transmitted from a remote controller to a testing front end module via a wired data connection between the remote controller and the testing front end module at M11. The testing routine signals may serve at M12 as basis for generating testing signals in the testing front end module. At M13, the generated testing signals are split and transmitted from the testing front end module to a plurality of DUTs coupled to the testing front end module.

In a second method M2, testing signals are generated at M21 in a testing front end module which are then split in M22 and subsequently transmitted from the testing front end module to a plurality of DUTs. At M23, testing response signals may be received from each of the plurality of DUTs by the testing front end module as response to the testing signals. At M24, the received testing response signals are transmitted from the testing front end module to a remote controller via a wired data connection between the remote controller and the testing front end module, so that the remote controller may evaluate the testing response signals at M25.

Processing circuits in the specification may, for example, be or comprise a microprocessor or microcontroller. Such processing circuits may be employed in a processing device, for example a central processing unit (CPU) and/or a coprocessor and/or a digital signal processor and/or an embedded processor. The processing circuit may for instance include one, or more, processor cores which can execute the instructions in a memory connected to the processor core. The processor cores may for instance include the logic circuitry required to execute program code in the form of machine code. The processor cores may for instance at least include an instruction decoder, an arithmetic unit, an address generation unit, and a load/store unit. The processing circuit may for example include, in addition to the processor core, inputs/outputs or other components, such as and/or communication interfaces and/or coprocessors and/or analog-to-digital converters and/or clocks and reset generation units, voltage regulators, memory (such as for instance flash, EEPROM, RAM), error correction code logic and/or timers or other suitable components.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections between various elements as shown and described with respect to the drawings may be a type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, details of the circuitry and its components will not be explained in any greater extent than that considered necessary as illustrated above, for the understanding and appreciation of the underlying concepts of the present invention and in order not to obfuscate or distract from the teachings of the present invention.

Also, the invention is not limited to physical devices or units implemented in non-programmable hardware, but can also be applied in programmable devices or units able to perform the desired device functions by operating in accordance with suitable program code. Furthermore, the devices may be physically distributed over a number of apparatuses, while functionally operating as a single device. Devices functionally forming separate devices may be integrated in a single physical device. Those skilled in the art will recognize that the boundaries between logic or functional blocks are merely illustrative and that alternative embodiments may merge logic or functional blocks or impose an alternate decomposition of functionality upon various logic or functional blocks.

In the description, any reference signs shall not be construed as limiting the claim. The word "comprising" does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage. The order of method steps as presented in a claim does not prejudice the order in which the steps may actually be carried, unless specifically recited in the claim.

Skilled artisans will appreciate that the illustrations of chosen elements in the drawings are only used to help to improve the understanding of the functionality and the arrangements of these elements in various embodiments of the present invention. Also, common and well understood elements that are useful or necessary in a commercially feasible embodiment are generally not depicted in the drawings in order to facilitate the understanding of the technical concept of these various embodiments of the present invention. It will further be appreciated that certain procedural stages in the described methods may be described or depicted in a particular order of occurrence while those skilled in the art will understand that such specificity with respect to sequence is not actually required.

What is claimed is:

1. A testing method for testing a plurality of devices under test (DUT), the method comprising:
    transmitting testing routine signals from a remote controller to a testing front end module via a wired data connection between the remote controller and the testing front end module, wherein the wired data connection is a universal serial bus (USB) connection, a peripheral component interconnect express (PCIe) connection, a Thunderbolt connection, or a Firewire connection, wherein a data rate of the wired data connection is at least 1 megabits per second (Mbps);
    generating testing signals in the testing front end module on the basis of the testing routine signals; and
    splitting the generated testing signals and transmitting the split testing signals from the testing front end module to a plurality of DUTs.

2. A testing method for testing a plurality of devices under test (DUT), the method comprising:
    transmitting testing routine signals from a remote controller to a testing front end module via a wired data connection between the remote controller and the testing front end module, wherein the wired data connection is a universal serial bus (USB) connection, a peripheral component interconnect express (PCIe) connection, a Thunderbolt connection, or a Firewire connection, wherein a physical length of a cable of the wired data connection is at least 60 inches;
    generating testing signals in the testing front end module on the basis of the testing routine signals; and
    splitting the generated testing signals and transmitting the split testing signals from the testing front end module to a plurality of DUTs.

3. A testing method for testing a plurality of devices under test (DUT), the method comprising:
    generating testing signals in a testing front end module;
    splitting the generated testing signals and transmitting the split testing signals from the testing front end module to a plurality of DUTs;
    receiving testing response signals upon the split testing signals from each of the plurality of DUTs by the testing front end module;
    transmitting the received testing response signals from the testing front end module to a remote controller via a wired data connection between the remote controller and the testing front end module; and
    evaluating the testing response signals in the remote controller.

4. The testing method of claim 3, wherein the wired data connection is a universal serial bus connection, a peripheral component interconnect express (PCIe) connection, a Thunderbolt connection, or a Firewire connection.

5. The testing method of claim 4, wherein a data rate of the wired data connection is at least 1 megabits per second (Mbps).

6. The testing method of claim 4, wherein a physical length of a cable of the wired data connection is at least 60 inches.

7. A testing front end module for testing a plurality of devices under test (DUT), the testing front end module comprising:
    a testing signal interface;
    a vector signal generator (VSG) coupled to the testing signal interface and configured to generate testing signals upon reception of testing routine signals from a remote controller via the testing signal interface;
    a vector signal analyser (VSA) coupled to the testing signal interface and configured to receive testing response signals from a plurality of DUTs and to transmit the received testing response signals to the remote controller via the testing signal interface;
    a multiplexer/demultiplexer (MUX/DEMUX) coupled to the VSG and the VSA, the MUX/DEMUX being configured to multiplex the received testing response signals and to demultiplex the generated testing signals; and
    a test device interface coupled to the MUX/DEMUX and configured to couple the testing front end module to the plurality of DUTs.

8. The testing front end module of claim 7, wherein the test device interface comprises at least four input/output ports configured to be connected to DUTs.

9. The testing front end module of claim 8, wherein the test device interface comprises at least eight input/output ports configured to be connected to DUTs.

10. The testing front end module of claim 8, wherein the MUX/DEMUX comprises at least one of a set of independently controllable attenuators, a set of independently controllable calibration units, and a switch fabric configured to selectively switch the input/output ports of the test device interface to one of the VSA and the VSG.

11. The testing front end module of claim 7, wherein the testing signal interface comprises one or more of a universal serial bus (USB) port, a peripheral component interconnect express (PCIe) port, a Thunderbolt port, and a Firewire port.

12. The testing front end module of claim 7, wherein the testing signal interface is configured to operate with a data rate of at least 1 megabits per second (Mbps).

13. The testing front end module of claim 7, further comprising:

a power supply interface coupled to the VSG and the VSA and configured to supply power to the VSG and the VSA from an external power supply coupled to the power supply interface.

14. A testing system for testing a plurality of devices under test (DUT), the testing system comprising:
- a controller; and
- a testing front end module, the testing front end module comprising:
  - a testing interface;
  - a vector signal generator (VSG) coupled to the testing signal interface and configured to generate testing signals upon reception of testing routine signals from the controller via the testing signal interface;
  - a vector signal analyser (VSA) coupled to the testing signal interface and configured to receive testing response signals from a plurality of DUTs and to transmit the received testing response signals to the controller via the testing signal interface;
  - a multiplexer/demultiplexer (MUX/DEMUX) coupled to the VSG and the VSA, the MUX/DEMUX being configured to multiplex the received testing response signals and to demultiplex the generated testing signals; and
  - a test device interface coupled to the MUX/DEMUX and configured to couple the testing front end module to the plurality of DUTs, wherein the controller is coupled to the testing signal interface of the testing front end module via a wired data connection.

15. The testing system of claim 14, wherein the wired data connection comprises at least one cable and wherein a physical length of the at least one cable of the wired data connection is at least 60 inches.

16. The testing system of claim 14, wherein the testing signal interface of the testing front end module comprises one or more of a universal serial bus (USB) port, a peripheral component interconnect express (PCIe) port, a Thunderbolt port, and a Firewire port.

17. The testing system of claim 14, wherein the MUX/DEMUX of the testing front end module comprises at least one of a set of independently controllable attenuators, a set of independently controllable units, and a switch fabric configured to selectively switch input/output ports of the test device interface to one of the VSA and the VSG.

18. The testing system of claim 14, wherein the controller is configured to generate testing routine signals to be sent to the testing front end module via the testing signal interface, and wherein the controller is configured to evaluate the testing response signals from the plurality of DUTs sent from the testing front end module via the testing signal interface.

* * * * *